Feb. 18, 1930.  G. H. WOHLART  1,748,006
BUSHING
Filed Oct. 28, 1926

INVENTOR.
George H. Wohlart
BY Thos. A. Donnell
ATTORNEY.

Patented Feb. 18, 1930

1,748,006

UNITED STATES PATENT OFFICE

GEORGE H. WOHLART, OF DETROIT, MICHIGAN

BUSHING

Application filed October 28, 1926. Serial No. 144,822.

My invention relates to a new and useful improvement in a bushing, and particularly a guide bushing such as is used with drills, taps, etc., in which a guide bushing is positioned in a liner bushing mounted in a jig plate or other suitable support.

The invention consists in a structure of the liner bushing and the guide bushing, and relates to the detail of structure of these bushings, and particularly co-operating parts thereof.

It is an object of the present invention to provide a guide bushing so constructed and arranged that it may be easily and quickly mounted in a liner bushing and locked therein, and that upon reverse rotation it may be moved axially to a position relatively to the liner bushing, that it is detached therefrom so that upon a slight reverse rotation of the guide bushing the guide bushing may be elevated manually axially from the liner bushing.

It is another object of the invention to provide on the guide bushing a locking member which engages with a co-operating locking member on the liner bushing so as to prevent axial relative movement of said bushings under normal conditions, and so as to effect upon movement of the guide bushing relatively to the liner bushing in reverse direction a predetermined distance, an axial movement of the guide bushing relatively to the liner bushing.

Other objects will appear hereinafter.

The invention consists in the combination and arrangement of parts hereinafter described and claimed.

The invention will be best understood from a reference to the accompanying drawings, which form a part of this specification, and in which, Fig. 1 is a perspective view of the guide bushing with a part broken away and shown in section.

Figure 1:
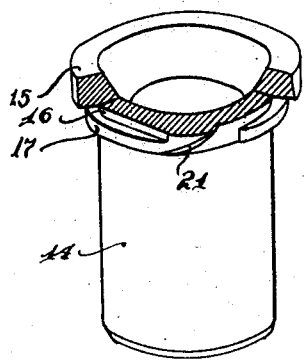
Figure 3:
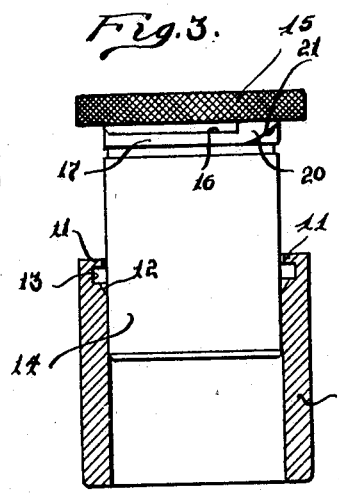
Fig. 3 is a side elevational view of the guide bushing mounted in the liner bushing which is shown in a central vertical section.
Figure 4:
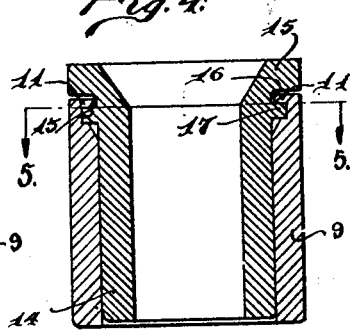
Fig. 4 is a central vertical sectional view of the two bushings in locked relation.
Figure 2:
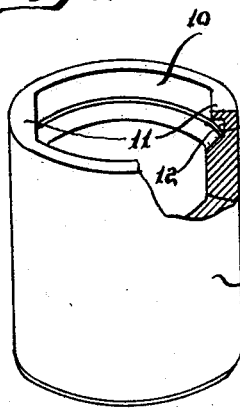
Fig. 2 is a perspective view of the liner bushing with a part broken away and shown in section.
Figure 5:
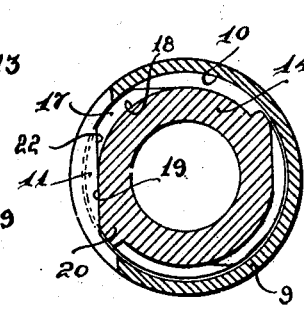
Fig. 5 is a sectional view of the invention taken on substantially line 5—5 of Fig. 4 showing the bushings in axially immovable relation.
Figure 6:
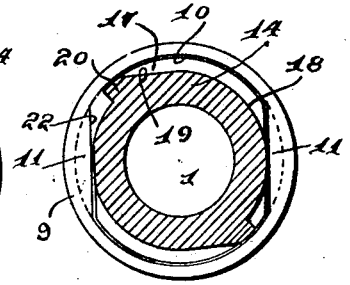
Fig. 6 is a view similar to Fig. 5 showing the bushings in position for relative axial movement.
Figure 7:
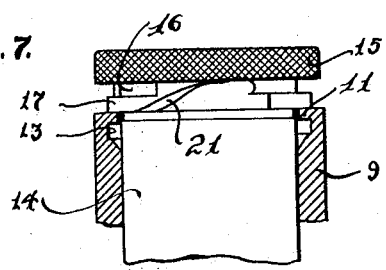
Fig. 7 is a fragmentary perspective view of the guide bushing showing it axially moved to inoperative position through reverse rotation.

The liner bushing 9 is adapted for being supported by a suitable jig plate or the like, the jig plate being provided with openings for the reception of the liner bushing 9, and into which the liner bushing may be secured by press fit. The liner bushing 9 adjacent its upper end is provided with a portion 10 of reduced thickness, and projecting inwardly from the upper edge of the portion 10 at diametrically opposite points are flanges 11, these flanges being formed when the reduced portion 10 is ground away, the flanges 11 being left intact so as to provide between the shoulder 12 and the under surface of the flange 11 a groove 13. This groove 13 lies in a plane at right angles to the axis of the bushing 9.

The guide bushing 14 which is adapted to seat in the liner bushing 9 is provided at one end with a head 15, the body being milled away to form the head 15 and leave, at diametrically opposite points on the bushing 14 below the head 15, a slight amount of material in which is formed a groove 16, thus providing a peripheral flange 17. The base of this groove 16 is circumferential as at 18 for a portion of its distance and tangential to the periphery of the bushing 14 as at 19. Consequently, one end of the groove is projected outwardly from the periphery of the bushing 14. The excess material terminates in a wedge shaped boss 20, having an inclined surface 21.

In operation the guide bushing 14 is inserted in the liner bushing 9 until the flange 17 engages the upper surface of the flange 11. A turning of the guide bushing until the flange 17 disengages the flange 11 permits the inward axial movement of the bushing 14 relatively to the bushing 9, and a further turning of the bushing 14 in a clockwise direction causes the flange 17 to enter the groove 13, this movement continuing until the tangental portion 19 of the groove 16 engages the flat edge of the flange 11, these flat edges 22 forming chords on the circle determined by the bushing 9. A further rotation in a clockwise direction of the bushing 14 is then prevented, the flat surfaces 22 and 19 engaging to effect the desired locking. This locking engagement is quite effective for the purposes intended, and at the same time does not prevent an easy backward rotation of the guide bushing when desired.

When it is desired to remove the guide bushing from the liner bushing the guide bushing is rotated in a reverse direction, and slightly after the flange 17 disengages from the groove 13, the edge of the flange 11 engages the inclined surface 21 so that as the rotation of the bushing 14 continues the bushing 14 is moved axially of the bushing 9 until the under surface of the flange 17 engages the upper surface of the flange 11. The bushing 14 may then be raised axially by the head and disengaged entirely from the bushing 9.

It will be noted that in the locking operation the bushing 14 is not moved axially relatively to the bushing 9 so that in this locking operation no radial thrust is delivered to the guide bushing. This is an important feature of the invention as the locking devices which move the bushings axially of each other are inclined to bind, thus rendering the removal of the guide bushing from the liner bushing quite difficult at times. Furthermore, the flat bearing surfaces or engaging surfaces provide a maximum area for locking purposes, and by having these engaging surfaces at diametrically opposite points with the area increased to a maximum, a durable structure is provided which renders this particular type of bushing highly efficient in use.

While I have illustrated and described a preferred form of structure, I do not wish to limit myself to the precise form of structure shown, but desire to avail myself of such variations and modifications as may come within the scope of the appended claim.

Having thus described my invention what I claim as new and desire to secure by Letters Patent is:

A liner bushing; an inwardly projecting flange on said liner bushing having its inner edge extended chordally of said bushing; a guide bushing adapted for insertion into said liner bushing; a circumferentially extending peripheral projection on said guide bushing provided with a groove for the reception of said flange, a portion of the base of said groove being tangent to the periphery of said guide bushing, the engagement of said tangent portion of said base, with the edge of said flange locking said bushings against relative rotation in one direction; an inclined under surface on said projection at one end adapted upon rotation of said guide bushing relatively to said liner bushing beyond a predetermined distance for engaging said flange and moving said guide bushing axially of said liner bushing.

In testimony whereof I have signed the foregoing.

GEORGE H. WOHLART.